United States Patent
Bodi et al.

(10) Patent No.: US 9,794,268 B2
(45) Date of Patent: *Oct. 17, 2017

(54) PRIVACY POLICY MANAGEMENT METHOD FOR A USER DEVICE

(75) Inventors: Miklos Tamas Bodi, Budapest (HU); Gabor Marton, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/501,844

(22) PCT Filed: Oct. 16, 2009

(86) PCT No.: PCT/EP2009/063536
§ 371 (c)(1),
(2), (4) Date: Apr. 13, 2012

(87) PCT Pub. No.: WO2011/044944
PCT Pub. Date: Apr. 21, 2011

(65) Prior Publication Data
US 2012/0204222 A1  Aug. 9, 2012

(51) Int. Cl.
*H04L 29/06* (2006.01)

(52) U.S. Cl.
CPC ............ *H04L 63/105* (2013.01); *H04L 63/20* (2013.01)

(58) Field of Classification Search
CPC .............................. H04L 63/20; H04L 63/105
USPC ............................................................ 726/1
See application file for complete search history.

(56) References Cited

U.S. PATENT DOCUMENTS

| 8,434,126 B1* | 4/2013 | Schepis ............ H04N 21/44222 726/1 |
| 8,750,839 B1* | 6/2014 | Paczkowski ........ H04L 65/1016 455/414.1 |
| 8,918,834 B1* | 12/2014 | Samuelsson ............ H04L 63/20 726/1 |
| 2001/0025248 A1* | 9/2001 | Nihei ................... G06Q 10/109 455/414.1 |
| 2003/0130987 A1* | 7/2003 | Edlund ............. G06F 17/30241 |
| 2004/0068578 A1* | 4/2004 | Corson ................. H04L 12/185 709/238 |
| 2004/0260574 A1* | 12/2004 | Gross ..................... G06Q 30/02 705/1.1 |

(Continued)

FOREIGN PATENT DOCUMENTS

EP    2043298 A2    4/2009

OTHER PUBLICATIONS

International Search Report corresponding to International Patent Application No. PCT/EP2009/063536 dated Aug. 19, 2010.

(Continued)

*Primary Examiner* — Hadi Armouche
*Assistant Examiner* — Shahriar Zarrineh
(74) *Attorney, Agent, or Firm* — Squire Patton Boggs (US) LLP (57) ABSTRACT

An arrangement for enabling users to set and modify privacy policies is described. User attributes and existing privacy policies are used to determine the similarity between users. On this basis, the nearest-neighbors to a particular user are determined. When a user is required or wishes to provide or modify a policy, the policies of those nearest neighbors are used to recommend a privacy policy to the user.

9 Claims, 4 Drawing Sheets

(56) References Cited

U.S. PATENT DOCUMENTS

| | | | |
|---|---|---|---|
| 2005/0071223 A1* | 3/2005 | Jain | G06Q 30/02 705/14.13 |
| 2005/0165832 A1* | 7/2005 | Adam Barry | G06Q 30/02 |
| 2006/0072456 A1 | 4/2006 | Chari et al. | |
| 2006/0141995 A1* | 6/2006 | Purnadi | H04L 63/102 455/414.1 |
| 2006/0167894 A1* | 7/2006 | Wunner | H04L 29/06 |
| 2006/0212924 A1* | 9/2006 | Xie | H04L 63/102 726/1 |
| 2006/0277591 A1* | 12/2006 | Arnold | G06F 21/62 726/1 |
| 2007/0030855 A1* | 2/2007 | Ribiere | H04L 45/02 370/401 |
| 2007/0297405 A1* | 12/2007 | He | H04L 45/00 370/389 |
| 2008/0115205 A1* | 5/2008 | Aaron | H04L 63/20 726/14 |
| 2008/0320549 A1* | 12/2008 | Bertino | G06F 21/604 726/1 |
| 2009/0013376 A1* | 1/2009 | Iwasaki | G06Q 10/107 726/1 |
| 2009/0030995 A1 | 1/2009 | Boudreau et al. | |
| 2009/0077126 A1* | 3/2009 | Li | G06Q 30/02 |
| 2009/0164835 A1* | 6/2009 | Uttaro | H04L 41/0668 714/4.1 |
| 2009/0205013 A1* | 8/2009 | Lowes | G06F 21/10 726/1 |
| 2010/0036779 A1* | 2/2010 | Sadeh-Koniecpol | H04L 63/20 706/11 |
| 2010/0058442 A1* | 3/2010 | Costa | H04L 63/20 726/3 |
| 2010/0076777 A1* | 3/2010 | Paretti | G06Q 30/02 705/1.1 |
| 2010/0077484 A1* | 3/2010 | Paretti | G06F 21/6245 726/26 |
| 2010/0138443 A1* | 6/2010 | Ramakrishnan | G06F 17/30038 707/769 |
| 2010/0235877 A1* | 9/2010 | Hu | H04L 63/0227 726/1 |

OTHER PUBLICATIONS

Platform for Privacy Preferences (P3P) Project, Enabling Smarter Privacy Tools for the Web; PLING—W3C Policy Languages Interest Group, http://www.w3org/P3P/, 4 pages.

RFC 4745—Common Policy: A Document Format for Expressing Priva, H. Schulzrinne et al., Feb. 2007, http://www.faqs.org/rfcs/rfc4745.html, 23 pages.

eXtensible Access Control Markup Language, (XACML) Version 2.0, Oasis Standard, Feb. 1, 2005, Document Identifier: oasis-access_control-xacml-2.0-core-spec-os, Location: http://docs.oasis-open.org/xacml/2.0/access_control-xacml-2.0-core-spec-os.pdf, 141 pages.

* cited by examiner

Fig. 1

| $|a_{ki} - a_{kj}|$ | $d(a_{ki}, a_{kj})$ |
|---|---|
| >20,000 km | -1 |
| >5,000, ≤20,000 km | -0.5 |
| >100, ≤5,000 km | 0 |
| >0, ≤100 km | 0.5 |
| 0 km | 1 |

PRIVACY POLICY MANAGEMENT METHOD FOR A USER DEVICE

The invention relates to the management of policies, such as privacy policies that might, for example, define the extent to which an application (such as an Internet application) is allowed to access user details.

There are increasing numbers of services and applications (such as Internet applications) that store personal data of users. As individuals use more and more services, an increasing amount of personal data is exposed to such applications, and therefore potentially exposed outside those applications. Many users are unaware (or are at least only partially aware) of who has access to their personal data, and for what purposes, and who is able to reveal their personal identity and other data. As a result, there is an increasing demand for identity and privacy protection.

One approach to privacy protection is to formulate access control policies for personal data. Policies are built up of rules that define the access rights of entities of a system to the users' personal attributes. Such policies can be formed in policy languages such as extensible access control markup language (XACML), platform for privacy protection (P3P) project and Common Policy.

However, as the exposure of personal data to multiple applications and services has increased, privacy policies have become increasingly complex and opaque to the user. In a sophisticated system, policies might even be automatically generated and modified.

It is difficult for users to follow regularly changing privacy policies and to remain aware of which services (or other entities) have access to which attribute and why. The tracking of such policies requires an amount of time and effort that many users are not willing to expend.

There remains a need to enable users to set and modify privacy policies in accordance with their needs and wishes, without the setting and modification of such policies being unduly burdensome.

The present invention seeks to address at least some of the problems outlined above.

The present invention provides a method of privacy policy management comprising: determining a similarity between a first user and each of a plurality of other users; determining, on the basis of said similarity, which of the plurality of other users are nearest neighbours to the first user; and providing one or more recommended privacy policy settings to the first user on the basis of privacy policy settings of said determined nearest neighbours.

The present invention also provides an apparatus comprising: a first input for receiving data relating to a plurality of users; a first processor for determining, on the basis of said data, a similarity between a first user and each of a plurality of other users (often by applying one or more distance functions); a second processor for determining, on the basis of said similarity, which of the plurality of other users are nearest neighbours to the first user; and a third processor for generating one or more recommended privacy policy settings to the first user on the basis of privacy policy settings of said determined nearest neighbours.

Thus, the present invention provides an apparatus and method that seek to assist users in setting and modifying privacy policies and the like. The invention aims to provide a better user experience by enabling a user to set such policies in accordance with their needs and wishes, but with reduced effort compared with known solutions. The invention seeks to avoid the need for users to continuously monitor complex policies sets and change policy rules one by one, without requiring the user to accept global policy sets. The invention aims to propose access control settings that are most appropriate to the user, whilst providing the flexibility to enable users to decide whether proposed settings should be accepted or not.

Determining the similarity between the first user and each of the plurality of other users typically comprises determining, for each of the plurality of other users, the similarity of a first set of data associated with the first user and a second set of data associated with each of the plurality of other users. A distance function may be defined to convert the differences between the sets of data into a numerical ranking.

Determining the similarity between a first user and one of said plurality of other users may comprise applying one or more distance functions (such as a user attribute distance function). The distance functions express the similarity between the data, and therefore between the users. The distance function may provide an output indicative of the similarity having a numerical value between −1 (indicating total dissimilarity) and +1 (indicating total similarity).

The invention may also include defining at least one of the said one or more distance functions. The distance function may relate to a variety of factors, such as the home addresses of the users, or the ages of the users. The distance functions may be weighted, so that more important distance functions have more impact on the overall measure of similarity between users than less important factors.

Determining the similarity between users may include considering the similarity between at least some of the user attributes of said users. Alternatively, or in addition, determining the similarity between users may include considering the similarity between at least some of the privacy policy decisions of said users. User attributes and privacy policy decisions are often particularly relevant in a policy management environment and may well be readily available. Of course, other variables could be used as well as, or instead of, user attributes and/or privacy policy decisions.

In some forms of the invention, the nearest neighbour to the first user of said plurality of others users is the one of the other users that has the highest similarity to the first user.

Determining which of the plurality of other users are nearest neighbours to the first user may comprise determining a predetermined number of said plurality of other users that have the highest similarity to the first user.

In some forms of the invention, providing recommended privacy policy settings comprises determining, for a potential policy, whether more than a first predetermined proportion of said nearest neighbours have set said policy. For example, a privacy policy may be recommended if more than a first proportion (e.g. two-thirds) of nearest neighbours have selected the policy.

Alternatively, or in addition, providing recommended privacy policy settings may comprises determining, for a potential policy, whether fewer than a second predetermined proportion of said nearest neighbours have set said policy. For example, not setting a particular privacy policy may be recommended if fewer than a second proportion (e.g. one-third) of nearest neighbours have selected the policy.

In some forms of the invention, the step of determining, for a potential policy, whether a proportion of said nearest neighbours have set said policy considers only those nearest neighbours that have made a decision regarding whether or not to set said policy. A predetermined number of nearest neighbours may be considered. If some are omitted from consideration on the basis that these users have not made a decision on the policy concerned, then the number of relevant nearest neighbours may be smaller. Alternatively, more nearest neighbours may be considered, by including further users with slightly less similarity to the first user as nearest neighbours.

The invention may include comparing a recommended privacy policy for the first user with a primary attitude of said first user. If the primary attitude appears to conflict with the recommended privacy policy, this may be indicated to the user.

The present invention may provide a computer program comprising: code (or some other means) for determining a similarity between a first user and each of a plurality of other users; code (or some other means) for determining, on the basis of said similarity, which of the plurality of other users are nearest neighbours to the first user; and code (or some other means) for providing one or more recommended privacy policy settings to the first user on the basis of privacy policy settings of said determined nearest neighbours. The computer program may be a computer program product comprising a computer-readable medium bearing computer program code embodied therein for use with a computer.

Exemplary embodiments of the invention are described below, by way of example only, with reference to the following numbered drawings.

The present invention proposes a system and method that helps users to set or modify privacy policies by making recommendations to the user regarding how to set or modify such policies. The recommendations are based on information that is known about the user concerned, such as user properties and preferences of the user, and possibly also the user properties and preference of others, such as friends of the user. Providing recommendations dependent on known user properties or preferences makes it easier for users to formulate their policies and so leads to policies that properly reflect user requirements, whilst reducing the burden on the user.

Figure 1:
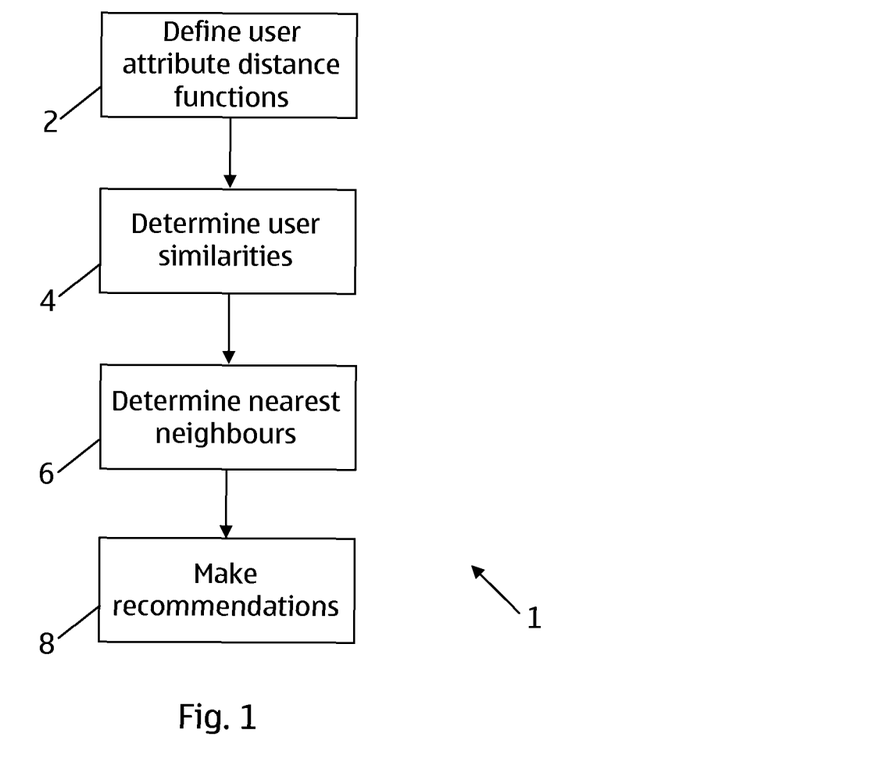
FIG. 1 is a flow chart showing an algorithm in accordance with an aspect of the present invention.

FIG. 1 is a flow chart showing an algorithm, indicated generally by the reference numeral 1, in accordance with an aspect of the present invention. As described in detail below, the algorithm 1 seeks to make recommendations to a user based on identifying similar users, determining policies applied by the identified similar users, and recommending that the user chooses options set in the policies of those similar users.

In order to make recommendations to a user based on determining policies applied by similar users, the algorithm must first determine which users are similar users. Thus, the algorithm 1 starts at step 2, where distance functions relating to a number of user-attributes are defined. Distance functions determine the methodology of representing the distance between two users concerning to a given user-attribute on a numerical scale, as described further below.

Next, at step 4, user data is used to determine the similarity between users by applying the distance functions defined in step 2. Once the similarity between a particular user and other users has been determined at step 4, the algorithm moves to step 6, where a number of nearest neighbours to the user are determined. A near neighbour is simply a user that scores highly on the user-similarity tests outlined above.

Finally, at step 8, policy recommendations based on the preferences of the determined nearest-neighbour(s) are made.

As indicated above, the algorithm 1 starts at step 2, with the definition of distance functions relating to each of a number of attributes. User attributes, which may well be known in a privacy setting environment, can be used to obtain an indication of the level of similarity between two different users.

The following are examples of the type of user attributes that might be used to determine the similarity between two users:

profile attributes such as name, phone number, age, address, job title etc.

community attributes such as preferred community groups at social sites, favourite sports clubs of the user, religion etc.

identity attributes such as userid, name, nickname, pseudonyms of the user at different service providers etc.

context attributes such as geographical location, activity, end user device type, living environment etc.

The distance between two users according to a given attribute can be defined in different ways. Consider, for example, the "home address" attribute of two different users. On one hand, we could define the distance between the two users from the aspect of physical distance of the users' homes. On the other hand, the "home address" could refer to the users' life environment and from this aspect a village at the countryside could be represented far away from a town on another scale; however the two settlements could be relatively close to each other physically.

The different aspects of the same user-attribute could be handled as different user-attributes. In this manner the set of user-attributes is extended with "new" user-attributes representing the different aspects of the same attribute.

The present invention defines a distance function (d) relating to each user-attribute and to the different aspects of the same attribute with the constraint that the co-domain of the distance function is the set of (−1,+1). The value of −1 indicates total dissimilarity and +1 indicates total similarity.

Figure 2:
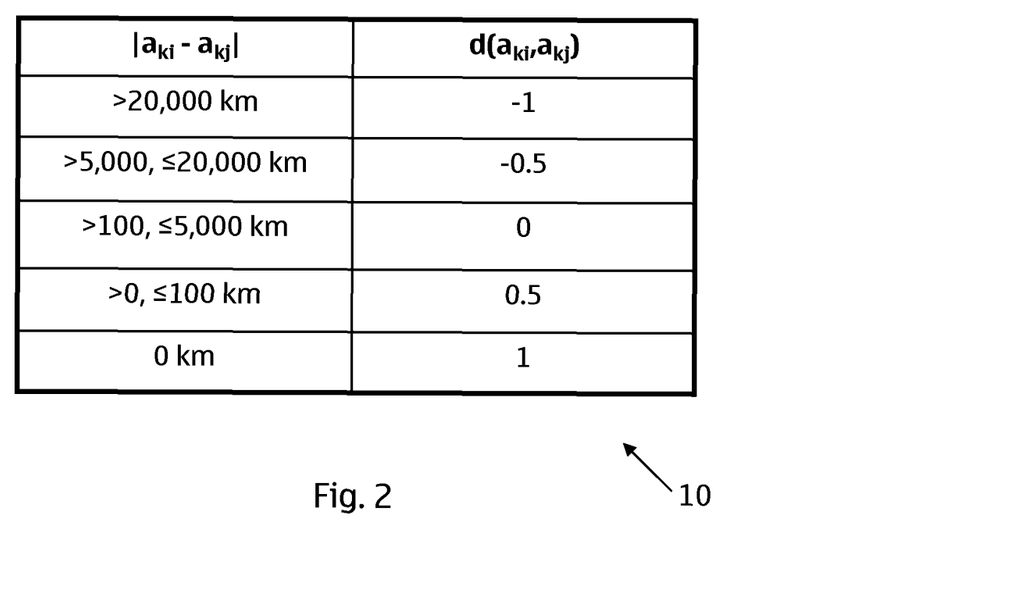
FIG. 2 is a table showing exemplary user data.

In case of the above example, the distance function (d) of the "home address" attribute from the aspect of physical distance could be defined as shown in the table 10 of FIG. 2.

The table 10 has two columns. The first column shows the distance between the home address of two users, which is expressed mathematically as: $|a_{ki}-a_{kj}|$, where $a_{ki}$ and $a_{kj}$ are the "home address" attribute of the first user (i) and the second user (j) respectively.

The table 10 has five rows. The first row indicates that if the physical distance between the addresses of the first and second users is greater than 20,000 km, then the distance function is set to −1 (indicating total dissimilarity). The second row indicates that if the physical distance is greater than 5,000 km, but less than or equal to 20,000 km, then the distance function is set to −0.5 (moderate dissimilarity). The third row indicates that if the physical distance is greater than 100 km, but less than or equal to 5000 km, then the distance function is set to 0 (neither similar nor dissimilar). The fourth row indicates that if the physical distance is greater than 0, but less than or equal to 100 km, then the distance function is set to 0.5 (moderate similarity). Finally, the fifth row indicates that if the physical distance is 0, then the distance function is set to 1 (total similarity).

To give another example, in case of the "age" attribute we could divide human lifecycle to age-groups and match each age-group with a number on a scale.

Once the methods of how to define the distance between two users relating to each attribute (and the different aspects of the same attribute) are defined, the similarity between different users relating to each attribute can be compared on a numerical scale. For example, in the case of the "home address" attributes discussed above with reference to the table 10, if the users are located 12,000 km apart, then the attribute according to the table 10 has a distance value of −0.5. Of course, the table of FIG. 2 is one of many examples. For example, the table could be replaced with a formula that defines the function so that a distance of 12,000 km might result in a distance function value of between −0.5 and −1, as defined by that formula.

The more aspects that are found to measure the distance between two users, the more accurately the similarity between users can be estimated. The different attributes and aspects of the same attribute could be calculated with different weights in the definition of similarity between two users. By setting up weights it is possible to fine tune the measurement of user-user similarities. For example, the physical distance between the "home address" attributes of two users may be considered to be more important (and therefore have a higher weighting) than the difference in the "age" attribute of two users, when making privacy policy recommendations.

Personal user attributes do not provide the only variables that can be used for determining user similarity. When registering to a new service, users typically have to make privacy related decisions such as whether or not they want to share some of their personal attributes with the service. In most of the cases they have to agree on sharing attributes that are mandatory to the service and usually they can make decisions on sharing attributes that are voluntary. Based on these decisions, it is possible to measure similarities between two different users. We can make the assumption that people who have made similar decisions in the past are likely to make similar decisions in the future. As a simple approach, if two users shared an attribute with a service, then their similarity from the viewpoint of this service-attribute pair is maximal; otherwise the similarity is minimal. Using this approach we can locate user decisions on a binary scale from different service-attribute viewpoints.

In the context of the present invention, user attributes and privacy policy decisions are convenient measures for determining user similarity; however, they are not the only available measures. Other measures could be used in addition to, or instead of, user attributes and/or privacy policy decisions when determining user similarity. For example, a service seeking to make policy recommendations to a user could query the social relationships of the user from a social networking site used by the user (with the user's consent). Information within such a social network site could be used to measure similarities between two users (e.g. by determining whether they are both member of a particular community within the social networking site).

Once the methodology of distance definition concerning each attribute (or other measures) has been chosen, the next step (step 4 of the algorithm 1) is to actually determine the similarities between users.

The proposed mechanism to determine the similarity between a first user (i) and a second user (j) is to calculate the weighted ($\alpha_k$) sum of the different user to user distances (d) concerning to each user-attribute (a).

The above definition determines the following formula:

$$s_{ij} = \sum_{k=1}^{n} \alpha_k \cdot d(a_{ki}, a_{kj}),$$

where:
$\alpha_k$ is the weight of the corresponding user-attribute or different aspects of the same user-attribute with the constraint that $$\sum_{k=1}^{n} \alpha_k = 1;$$

and
$d(a_{ki}, a_{kj})$ is the distance between the attribute $a_k$ of the user (i) and the attribute $a_k$ of the user (j) defined by the methodology of distance function definition (step 2 of the algorithm 1) with the constraint that $d(a_{ki}, a_{kj})=(-1,+1)$.

The result of the above formula ($S_{ij}$) represents the similarity between the two users. The value of +1 indicates total similarity and the value of −1 indicates total dissimilarity.

As described above, the physical distance between the home address of two users, and the age of those users are two of many possible attributes that could be used to determine similarity. As suggested above, in one exemplary implementation of the invention, the physical distance between the two home addresses is considered to be more important when defining similarity between two users. Accordingly, the "home address" attribute may have a higher weighting than the "age" attribute. The overall similarity between the users may therefore, for example, be given by:

$$s_{ij} = \frac{1}{3}d_1 + \frac{2}{3}d_2$$

Where $d_1$ is the "age" distance function and $d_2$ is the "home address" distance function.

As discussed above with reference to FIG. 1, once the definitions of distance functions relating to each user-attribute have been defined (step 2 of the algorithm 1) and the user similarities have been determined in accordance with the defined distance functions (step 4), the nearest neighbours are determined (step 6).

Determining the nearest neighbours to the user involves selecting the other users that have the highest similarity value (i.e. closest to +1). Typically, the step 6 involves selecting a set of k nearest neighbours, where k is a predefined value. For example, if k=10, then the step 6 involves selecting the 10 other users with the highest similarity value, as determined in the step 4.

Once the set of nearest neighbours has been determined, the next step (step 8) is to make recommendations to the user. A recommendation may, for example, be made when a user comes to a decision point (e.g. when a user registers with a service or, for example, when a service is modified to an extent that requires further user policy input).

Figure 3:
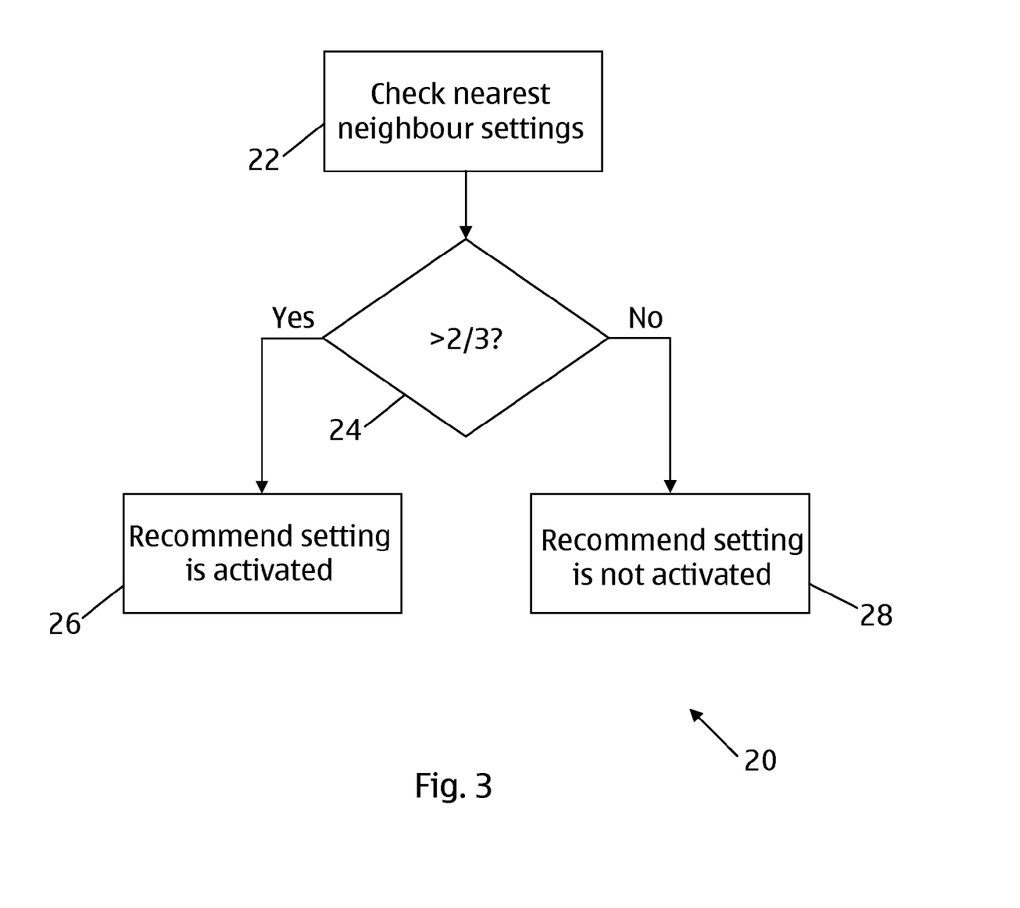
FIG. 3 is a flow chart showing an algorithm in accordance with an aspect of the present invention.

FIG. 3 shows an algorithm, indicated generally by the reference numeral 20, that may be used to make recommendations. The algorithm 20 is activated when a decision is required as to whether or not a particular privacy setting should be activated.

The algorithm 20 starts at step 22, where the corresponding privacy setting of each of the predefined group of nearest neighbours is checked. The algorithm 20 then moves to step 24, where it is determined whether or not at least two-thirds of the nearest neighbours have activated the relevant privacy setting.

If at least two-thirds of the nearest neighbours have activated the privacy setting, then the algorithm 20 moves to step 26, where activating the privacy setting is recommended. If fewer than two-thirds of the nearest neighbors have activated the privacy setting then the algorithm moves to step 28, where activating the privacy setting is not recommended. Of course, the details of the algorithm 20 will vary from case-to-case. For example, a proportion different from two-thirds could be selected.

Of course, the algorithm 20 could be more sophisticated than the example described above.

Figure 4:
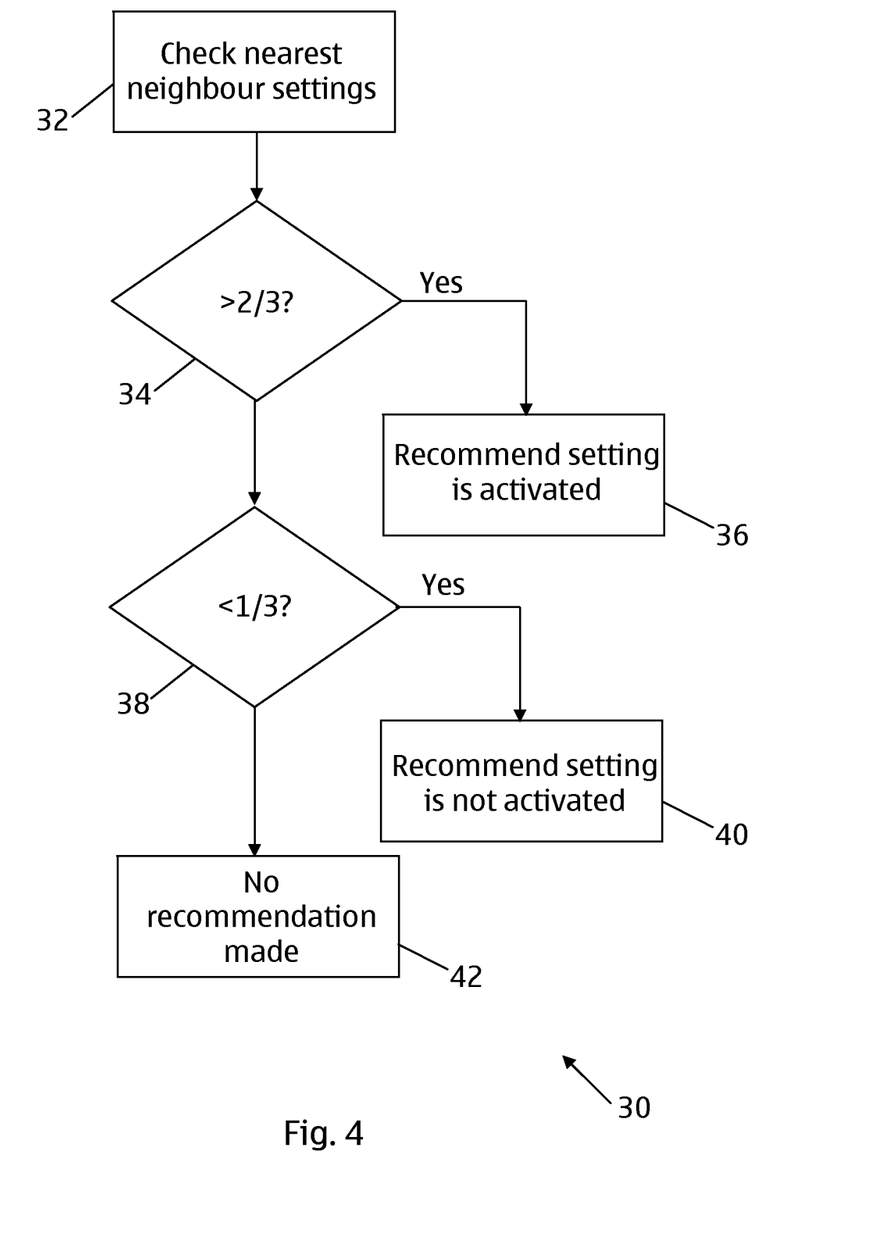
FIG. 4 is a flow chart showing an algorithm in accordance with an aspect of the present invention.

FIG. 4 shows an algorithm, indicated generally by the reference numeral 30, showing a variant of the algorithm 20. The algorithm 30 starts at step 32, where the corresponding privacy setting of each of the predefined group of nearest neighbours is checked. The algorithm 30 then moves to step 34, where it is determined whether or not at least a first proportion (e.g. two-thirds) of the nearest neighbours have activated the relevant privacy setting.

If at least the first proportion of the nearest neighbours have activated the privacy setting, then the algorithm 30 moves to step 36, where activating the privacy setting is recommended. The algorithm 30 then terminates. If fewer than two-thirds of the nearest neighbors have activated the privacy setting then the algorithm 30 moves to step 38.

At step 38, it is determined whether fewer than a second proportion of nearest neighbours have activated the privacy setting. The second proportion is lower than the first and may, for example, be one-third. If fewer than the second proportion of nearest neighbours have activated the privacy setting then the algorithm moves to step 40, where it is recommended that the privacy setting is not activated. The algorithm 30 then terminates. If more than the second proportion of nearest neighbours have activated the privacy setting, then the algorithm 30 terminates at step 42, where no recommendation is made regarding whether or not the user should activate that privacy setting.

Of course, the algorithms 20 and 30 are two of many examples of ways in which recommendations could be made, based on the settings of nearest-neighbours.

In many circumstances, when a recommendation regarding whether or not a user should accept a particular setting is being made, at least some of the nearest neighbours determined in the step 6 described above may not have made a decision on the point. For example, assume that a user registers to a service and a recommendation is to be made regarding whether the user should share an attribute with the service or not. A number of nearest neighbours to that user are determined, but many (or all) of those nearest neighbours have not decided whether or not the attribute should be shared (for example because the similar users have not yet registered with the service concerned). In this case, the similar user's sharing policy regarding the attribute may be in the default state determined by the similar user's default policies. This issue may be dealt with in a number of ways, some of which are outlined below.

Similar users discovered at step 6 may simply be ignored when making recommendations if they have not made a decision on the issue being considered. Thus, step 24 of the algorithm 20 described above, may determine whether a first proportion of nearest neighbours who have made a decision regarding the relevant privacy setting have activated that setting.

Another approach would be to find other attributes or settings similar to the one for which a recommendation is being requested and to make a recommendation on that basis. This approach would be more sophisticated than the above one, but would be more difficult to implement.

A further approach would be to select a predetermined number of nearest neighbours who have made a decision regarding the relevant privacy setting. Thus, if a substantial number of close neighbours have not made a decision of the privacy setting concerned, then neighbours who are less close (i.e. have a lower similarity measure) are considered.

Figure 5:
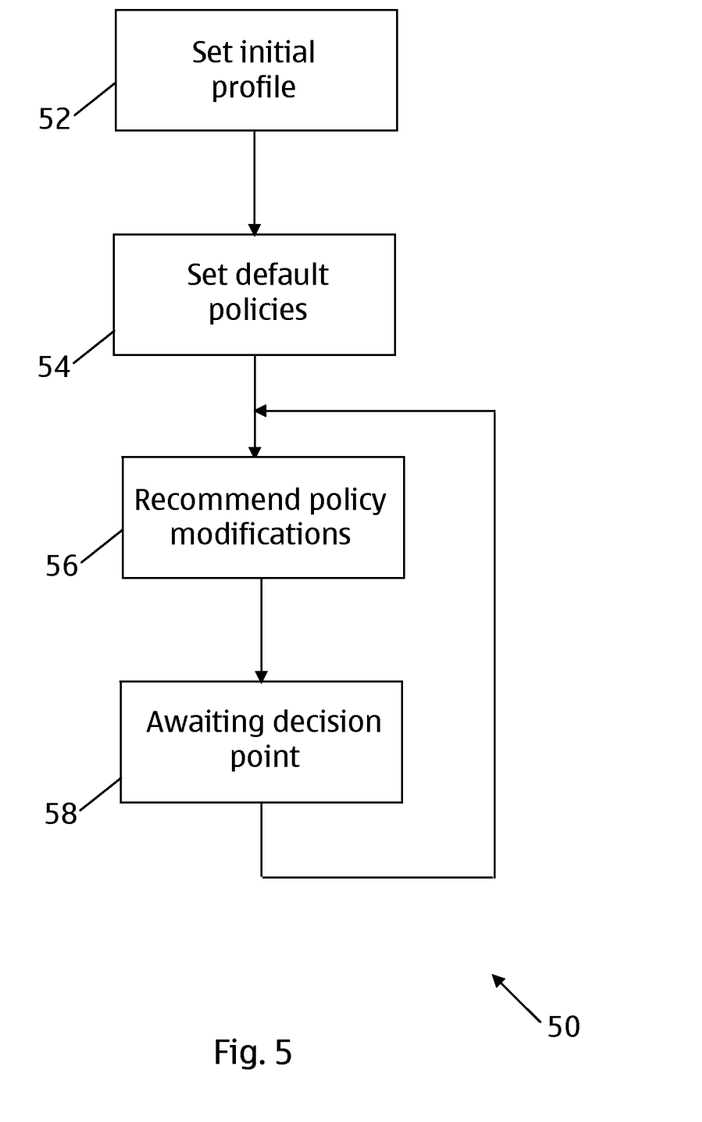
FIG. 5 is a flow chart showing an algorithm in accordance with an aspect of the present invention.

FIG. 5 shows an algorithm, indicated generally by the reference numeral 50, in accordance with an aspect of the present invention. The algorithm 50 shows an exemplary implementation of the present invention by a telecommunications operator.

The algorithm 50 starts at step 52, where new users make use of the system provided by the telecommunications operator. At step 52, the new user sets initial profile settings. For example, at step 52, a user may provide information such as their name, gender etc. and they also have to choose the defence level of their data. For example they can choose one of three predefined policy sets labeled by "paranoid", "cautious" or "exhibitionist".

The algorithm 50 then moves to step 54 where a default policy is set for the user. The default policy may contain policies regarding the most popular services and reflects the primary attitude of the user. For example we can assume that "paranoid" users will never want to share their location attribute to any service.

After the initial state, the algorithm 50 moves to step 56, where the system makes recommendations to the users on how to change their policy sets based on the nearest neighbour algorithms described above. At this time the determination of user-user similarities are not only based on the users' profile and actual policy set, but also on their telecommunications history (using data such as dialed numbers, location, call frequency etc.) as this data is accessible by the telecommunications operator. Ranking of these telecommunication-specific attributes could be done in a similar way as it was done in the case of the user attributes above. For example if two users dial the same number frequently (e.g. their favourite restaurant) they might want to have other similarities in their privacy policies (e.g. they both want to share their email address with the restaurant to get the weekly menu).

At step 56, the user can choose to accept a recommendation or not, as described above with reference to the algorithms 1, and 30.

At this stage, an initial default policy has been set at step 54 and modifications based on recommendations may have been made at step 56. The user can then proceed to make use of the services provided by the telecommunications operator, with the chosen security and privacy settings.

At some point in the future, a decision point is reached (step 58). When users reach a decision point (e.g. register to a new service), the system recommends the policy which is set by most of the users' nearest neighbours. At the same time this recommendation is compared with the users' primary attitude (with the default policy set actually) and any differences are highlighted to the user. For example, if the user's primary attitude is "paranoid" then presumably the user does not want to share his location attribute. However if most of his nearest neighbours share the location data, then the system will recommend him to also share location data, but will highlight the difference from his primary attitude.

Again, the user can choose whether or not to accept the recommendations made at step 56. The algorithm 50 then proceeds to step 58 until another decision point is reached.

The present invention provides systems and methods to assist users in setting and modifying privacy policies and the like. The invention aims to provide a better user experience by enabling a user to set such policies in accordance with their needs and wishes, but with reduced effort compared with known solutions. The invention seeks to avoid the need for users to continuously monitor complex policies sets and change policy rules one by one, without requiring the user to accept global policy sets. The invention aims to propose access control settings that are most appropriate to the user, whilst providing the flexibility to enable users to decide whether proposed settings should be accepted or not.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method of privacy policy management comprising:
determining, by at least one hardware processor, a similarity between a first user and each of a plurality of other users, wherein the determining of the similarity between the first user and each of the plurality of other users includes considering the similarity between at least some of the user attributes of said users, and wherein the determining of the similarity between users includes considering the similarity between at least some of the privacy policy decisions of said users;
determining, by the at least one hardware processor, on the basis of said similarity, which of the plurality of other users are nearest neighbours to the first user; and
providing, by the at least one hardware processor, one or more recommended privacy policy settings to the first user on the basis of privacy policy settings of said determined nearest neighbours, wherein the providing of the one or more recommended privacy policy settings comprises determining, for a potential policy, whether more than a first predetermined proportion of said nearest neighbours have set said policy,
wherein the determining of the similarity between a first user and one of said plurality of other users comprises applying one or more user attribute distance functions relating to a plurality of user attributes, wherein the one or more user attribute distance function is defined to convert the differences between the privacy policy decisions of said users into a respective numerical ranking,
wherein the providing of the one or more recommended privacy policy settings further comprises determining, for a potential policy, whether fewer than a second predetermined proportion of said nearest neighbours have set said policy.

2. A method as claimed in claim 1, wherein the determining which of the plurality of other users are nearest neighbours to the first user comprises determining a predetermined number of said plurality of other users that have the highest similarity to the first user.

3. A method as claimed in claim 1, wherein the providing recommended privacy policy settings comprises determining, for a potential policy, whether fewer than a second predetermined proportion of said nearest neighbours have set said policy.

4. A method as claimed in claim 1, wherein the determining, for a potential policy, whether a proportion of said nearest neighbours have set said policy considers only those nearest neighbours that have made a decision regarding whether or not to set said policy.

5. A method as claimed in claim 1, further comprising comparing a recommended privacy policy for the first user with a primary attitude of said first user.

6. A method as claimed in claim 1, wherein the first predetermined proportion and the second predetermined proportion are greater than zero.

7. An apparatus comprising:
a hardware input configured to receive data relating to a plurality of users;
at least one hardware processor configured to
determine, on the basis of said data, a similarity between a first user and each of a plurality of other users;
determine, on the basis of said similarity, which of the plurality of other users are nearest neighbours to the first user; and
generate one or more recommended privacy policy settings to the first user on the basis of privacy policy settings of said determined nearest neighbours, wherein the generating of the one or more recommended privacy policy setting comprises determining, for a potential policy, whether more than a first predetermined proportion of said nearest neighbours have set said policy,
wherein the at least one processor determines the similarity between users by applying one or more user attribute distance functions relating to a plurality of user attributes,
wherein when determining the similarity between users, said at least one processor is configured to consider the similarity between at least some of the user attributes of said users,
wherein when determining the similarity between users, said at least one processor is configured to consider the similarity between at least some of the privacy policy decisions of said users, and
wherein the one or more user attribute distance function is defined to convert the differences between the privacy policy decisions of said users into a respective numerical ranking,
wherein the generating of the one or more recommended privacy policy setting further comprises determining, for a potential policy, whether fewer than a second predetermined proportion of said nearest neighbours have set said policy.

8. An apparatus as claimed in claim 7, further comprising an output for providing the said recommended privacy policy settings to said first user.

9. A computer program product, embodied on a non-transitory computer readable medium, the computer program product configured to control a processor to perform a method, comprising:
determining a similarity between a first user and each of a plurality of other users, wherein the determining of the similarity between the first user and each of the plurality of other users includes considering the similarity between at least some of the user attributes of said users, and wherein the determining of the similarity between users includes considering the similarity between at least some of the privacy policy decisions of said users;

determining, on the basis of said similarity, which of the plurality of other users are nearest neighbours to the first user; and providing one or more recommended privacy policy settings to the first user on the basis of privacy policy settings of said determined nearest neighbours, wherein the providing of the one or more recommended privacy policy setting comprises determining, for a potential policy, whether more than a first predetermined proportion of said nearest neighbours have set said policy, wherein the determining of the similarity between a first user and one of said plurality of other users comprises applying one or more user attribute distance functions relating to a plurality of user attributes, wherein the one or more user attribute distance function is defined to convert the differences between the privacy policy decisions of said users into a respective numerical ranking, wherein the providing of the one or more recommended privacy policy settings further comprises determining, for a potential policy, whether fewer than a second predetermined proportion of said nearest neighbours have set said policy.

* * * * *